Dec. 24, 1968   E. SCHNABEL   3,417,786
ASSEMBLY OF TUBES OF DIFFERENT COEFFICIENTS
OF THERMAL EXPANSION
Filed Aug. 4, 1966   2 Sheets-Sheet 1

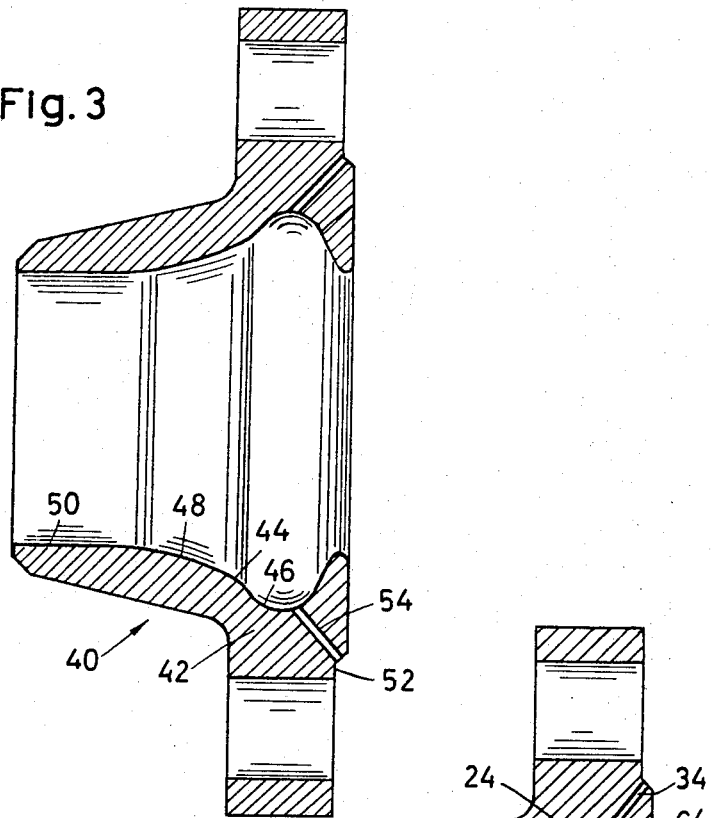
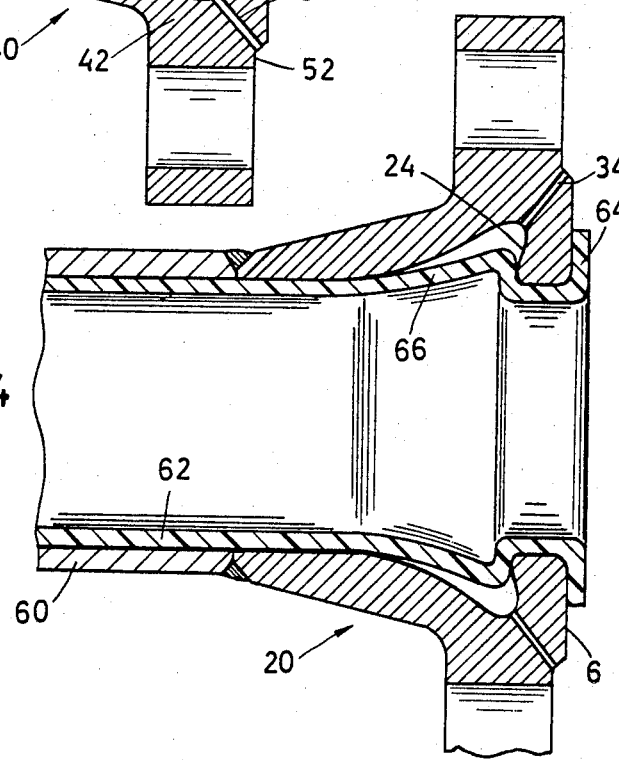

United States Patent Office 3,417,786
Patented Dec. 24, 1968

3,417,786
ASSEMBLY OF TUBES OF DIFFERENT CO-
EFFICIENTS OF THERMAL EXPANSION
Ernst Schnabel, Offheimer Weg,
6250 Limburg an der Lahn, Germany
Filed Aug. 4, 1966, Ser. No. 570,215
Claims priority, application Germany, Aug. 6, 1965,
Sch 37,508
9 Claims. (Cl. 138—140)

My invention relates to tubular assemblies and in particular to tubular assemblies where an outer tubular means is provided at its interior with an inner tubular means which forms a liner for the outer tubular means.

It is known, for example, to provide either metallic or non-metallic tubes with interior plastic materials so as to achieve in this way a given resistance to corrosion and/or erosion. There are essentially two basically different types of liners provided for such tubular assemblies. In one type the liner is bonded directly to the outer tube and the liner can be applied in the form of a coating. Thus, with this type of construction it is possible by dipping, sintering, rolling or spraying to provide the outer tube with a suitable plastic liner. My invention does not relate to this latter type of construction which requires the inner liner to have substantially the same coefficient of thermal expansion as the outer tube so that a reliable bond can be maintained between the outer tube and the inner liner.

In the case where there is a substantial difference between the coefficients of thermal expansion of the outer tube and the inner liner, it is necessary to provide a liner separate from the outer tube. This liner is drawn into the outer tube and before being drawn into the outer tube is already in finished tubular form.

In practically all cases where the finished tubular liner, usually made of a plastic such as polyvinyl chloride, polyethylene, polytetrafluoroethylene, or polyfluorethylene-propylene or other plastics, is drawn into the outer tube, it is not possible to bond the inner liner to the outer tube as by gluing the inner liner thereto or welding it thereto in any way, or to provide any other type of fixed union between the inner tubular liner and the outer tube, because in all cases the differences in the degrees of expansion and contraction of the outer tube and the inner tube are so great that the bond simply cannot be maintained.

Thus, with the constructions of this latter type, the inner tubular liner is simply situated loosely within the outer tube and is fixed to said outer tube only at predetermined points or areas, for example at the flanges, that is at the ends, of said outer tube. The tubes will slide one with respect to the other in order to take care of the differences in thermal expansion and contraction. In the case of polytetrafluoroethylene for example, the coefficient of thermal expansion is approximately six times as great as that of steel. It can be appreciated, therefore, that a considerable difference in expansion and contraction will take place between such materials during even relatively small temperature changes.

Of course, various attempts have been made to solve this problem. For example, it is known to manufacture the plastic liner tube in the form of a pair of tubular sections which are telescoped and which are sealed at the place where they overlap by way of an O-ring. The O-rings are made of a material different from the plastic tubular material, such as a silicone-elastomer. This solution to the problem has however not proved to be satisfactory.

It is accordingly a primary object of my invention to provide a tubular assembly which will avoid the above drawbacks and which will solve the above problem.

In particular, it is an object of my invention to provide a tubular assembly which will reliably prevent the formation of any cracks in the inner liner even though there are substantial differences in the extent of expansion and contraction of the outer tubular part with respect to the inner tubular liner.

It is furthermore an object of my invention to provide a construction of the above type which is exceedingly simple and inexpensive and which at the same time will operate reliably to prevent any cracks or other types of deterioration of the inner liner due to the different coefficients of thermal expansion existing between the inner liner and the outer tube which it lines.

In accordance with my invention, the tubular assembly includes the outer tubular means and inner tubular means which are respectively of substantially different coefficient of thermal expansion, the inner tubular means forming a liner for the outer tubular means and being fixed to said outer tube only at predetermined points or areas. The outer tubular means of my invention has an annular wall portion provided with an inner surface formed with a groove which thus provides the outer tubular means with an inner groove, and the inner tubular means has an annular expansion bulge which extends only partly into the inner groove of the outer tubular means, this expansion at mean or average temperature bulge itself providing the inner tubular means with an inner groove and with an outer circumferential rim which extends into the inner groove of the outer tubular means. As a result of this construction it is possible for the expansion bulge to move in the inner groove of the outer tubular means during expansion and contraction of the inner tubular means with respect to the outer tubular means, due to changes in temperature compared to the average temperature, so that in this way compensation can be provided for the difference between the coefficients of thermal expansion while at the same time avoiding the drawbacks of the prior art and providing a long and useful life for the assembly of my invention.

My invention is illustrated by way of example in the accompanying drawings which form part of my application and in which:

FIG. 3 is a longitudinal sectional elevation of another embodiment of part of a tubular means of my invention; and FIG. 4 shows the structure of FIG. 2 assembled with a liner.

Figure 1:
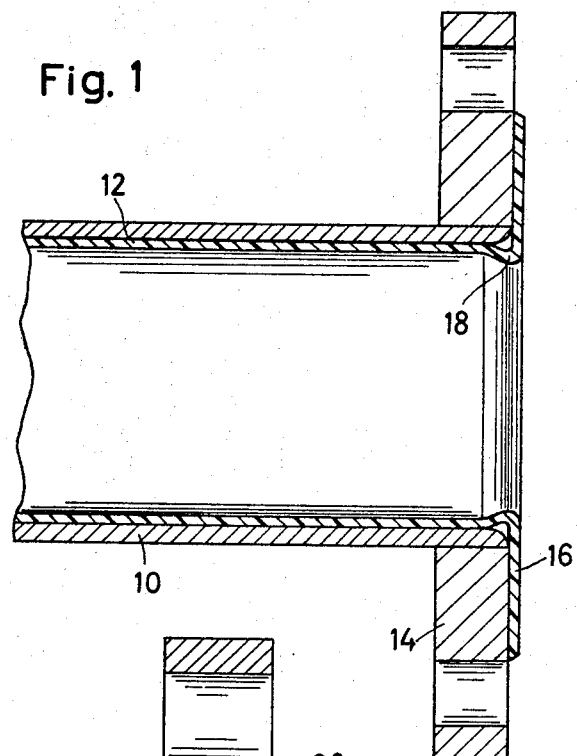
FIG. 1 illustrates the problem which is solved by my invention, the structure of FIG. 1 being shown in a longitudinal sectional elevation.

Referring now to FIG. 1, there is fragmentarily illustrated therein an outer tubular means 10 which is made of metal, for example, and an inner tubular means 12 in the form of a plastic liner which extends along the interior of the outer metal tube 10. At its right end, as viewed in FIG. 1, the tube 10 terminates in a flange 14, and the plastic liner 12 is formed at its right end, as viewed in FIG. 1, with an outwardly directed integral flange 16 so as to fix the plastic liner 12 to said outer tube 10 and form the tubular assembly shown in FIG. 1.

During heating of this assembly of FIG. 1, the inner plastic liner 12 will expand to an extent which is so much greater than the extent of expansion of the metal tube 10 that there will be formed at the inner periphery of the flange 16 a relatively sharp inwardly directed fold 18. During cooling the tube 12 will shrink to an extent greater than the outer tube 10 and returns substantially to its original configuration. It is therefore apparent that as a result of repeated changes in temperature the inner liner 12 will fold and unfold at the inner periphery of the flange 16, causing as a result of the frequent stressing of the liner at the inner periphery of the flange 16 formation of a crack and eventual breaking of the tube at the inner fold 18 which unavoidably forms as a result of the above factors. A further disadvantage of the problem illustrated in FIG. 1 resides in the fact that there is a considerable reduction in the cross section of the interior space of the tubular assembly as a result of the formation of the annular fold 18, and the result of this reduction in the cross section subjects the assembly to ready erosion.

Figure 2:
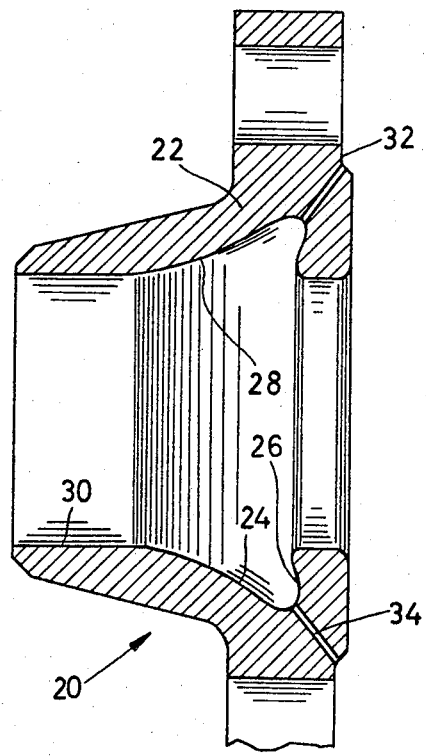
FIG. 2 shows in a longitudinal sectional elevation one part of a tubular means according to my invention.

Referring to FIG. 2, there is shown therein a part of an outer tubular means of my invention, this part being an end flange assembly 20 which can be separately welded onto the end of an outer metal tube so as to constitute an end flange part thereof. This part 20 of the tubular means of my invention has an annular wall portion 22 formed at its inner surface with an annular groove 24. In the example illustrated in FIG. 2 this annular groove 24 is defined at one side by a surface 26 of substantially S-shaped cross section and at its other side by a surface 28 of frustoconical cross section merging smoothly into the inner surface 30 of the outer tubular means. Therefore, with this construction it will be noted that the groove 24 extends not only inwardly but also toward the right end of the end flange unit 20 shown in FIG. 2.

This part 20 of the tubular means of my invention has an outer annular surface portion 32, and between this outer surface portion 32 and the groove 24 the part 20 of the outer tubular means of my invention is formed with at least one vent 34 providing communication between the outer surface 32 and the groove 24 for a purpose referred to below. In the illustrated example there are a plurality of such vents 34.

My invention is not necessarily limited to the specific configuration shown in FIG. 2. Thus, FIG. 3 shows an end flange unit 40 capable of being welded to the end of an outer tube in the same way as the unit 20 and also having an annular portion 42 formed, in accordance with my invention, with an inner groove 44, but in this case the groove 44 is defined by a portion 46 of substantially semicircular cross section and a portion 48 of frustoconical configuration merging smoothly into the inner surface 50 of this embodiment of my invention. The unit 40 also has an outer surface portion 52 communicating with the groove 48 by way of at least one, and preferably more than one, vent 54.

Referring now to FIG. 4, the end flange unit 20 of FIG. 2 is shown joined to a metal tube 60 as by being welded to one end thereof, and the assembly shown in FIG. 4 is provided with an inner plastic liner 62 of my invention. This liner 62 also terminates at its end in an outwardly directed flange 64 which is integral with the liner 62. Of course, it is to be understood that the structures shown in FIGS. 1-4 can be duplicated at the other end of the tubular assemblies. In many cases, this is a preferred embodiment of my tube assembly.

In accordance with my invention the liner 62 is formed with an outwardly directed expansion bulge 66 of annular configuration extending only partly into the groove 24. This expansion bulge 66 which is of annular configuration forms an integral part of the liner 62 and provides it with an inwardly directed annular groove and with an outwardly directed circumferential rim which extends into the groove 24. As is shown in FIG. 4, it is preferred to have the annular expansion bulge 66 of the inner tubular means extending only partly into the groove 24 so that it will be free to expand as well as contract while remaining in the groove 24, and of course the vents 34 prevent the formation of any cushions of air between the expansion bulge 66 and the part 20 in the groove 24. Such cushions of air might resist expansion and contraction of the tube 62 at its expansion bulge 66. It will be noted that with the structure of my invention the outer tubular means is formed at its inner groove with annular surfaces which are uniformly smooth and free of any sharp bends against which the inner liner might scrape during expansion and contraction with respect to the outer tubular means, so that in this way it is possible for the inner tubular means of my invention to smoothly roll onto and off from the outer tubular means in the groove thereof during expansion and contraction of the inner tubular means with respect to the outer tubular means.

It will be noted that the groove 24 extends not only inwardly but also toward the right end of the end flange unit shown in FIG. 4, where the tube liner is fixedly attached to the outer tubular means by means of a flange 64. Since the annular groove 24 extends towards said area of fixed union and since said groove is provided in the proximity of said area, the tubular liner does not exert any appreciable force on its outwardly directed flange 64. This force is counteracted only by the right-hand surface of the groove 24 which defines an acute angle with the axis of the tube assembly.

While my invention has been illustrated above in connection with straight tubular assemblies, it is of course equally applicable to curved tubular assemblies as well as to T-shaped tubular assemblies and the like. With the structure of my invention the expansion and contraction of the inner tubular means with respect to the outer tubular means can take place without the formation of any cracks or breaking of the inner tube means.

It is to be noted that although only one expansion bulge is shown for the inner tubular means of my invention in the drawings, any desired number of expansion bulges may be provided. Furthermore, it should be noted that these expansion bulges of the inner tubular means of my invention bulge outwardly into the inner groove of the outer tubular means, so that there is no reduction in the cross-sectional area of the interior of the tubular assembly of my invention. The depth and configuration chosen for the expansion bulge and for the groove formed in the outer tubular means will of course be determined to some extent by the particular materials which are used and the stresses to which they will be subjected. Of course, the inner groove of the outer tubular means of my invention can be formed at any desired integral wall portion of an outer tube and is not necessarily situated at an end flange unit as shown in FIGS. 2 and 3.

With the construction of my invention, after the end flange unit is welded onto the end of the outer tube, or after both of the end flange units are welded onto both ends of the outer tube, the plastic tubular liner is drawn into the interior of the outer tube and the outwardly directed end flanges are formed on the plastic tubular liner, so that in this way the tubular liner will have at each end a flange 64 as shown in FIG. 4. At this time heat and interior pressure are applied to the plastic liner to press it into the inner groove of the outer tubular means, such as the groove 24, and in this way the expansion bulge of my invention is formed directly in the inner plastic liner. It is preferred to deform the inner plastic liner. It is preferred to deform the inner tubular means so as to provide it with the expansion bulge in such a way that this expansion bulge extends only approximately 50% into the interior of the inner groove of the outer tubular means at average temperature. As a result the expansion bulge of my invention is capable of contracting during shrinkage of the liner and expanding during expansion of the liner and is able to move in both directions in the inner groove of the outer tubular means. Whether the plastic liner should be provided with an expansion bulge which extends to a greater of lesser degree than 50% into the inner groove of the outer tubular means will be determined to a large extent by the temperature changes with respect to normal or ambient temperature. Of course, the depth of the inner groove of the outer tubular means of my invention will depend upon the extent to which the inner plastic liner rolls into and out of the inner groove of the outer tubular means during expansion and contraction. As a result of the smooth surfaces throughout the inner groove of the outer tubular means and the rounded edges of the inner groove there will be no scratching or other damage to the exterior surface of the inner tubular means during expansion and contraction thereof with respect to the outer tubular means.

In one particular example of my invention where the outer tubular means had an inner diameter of 2 inches and a length of 1000 mm., this outer tubular means was provided at both ends with the flange units, such as the units 20, and these units 20 were each provided with inner annular grooves 24 having a depth of 15 mm. The tubular liner was made, for example, of polytetrafluoroethylene and extended to a depth of 7 mm. into the inner groove of the outer tubular means, this extent of entry of the expansion bulge into the inner groove of the outer tubular means being brought about by heat and inner pressure applied to the inner tubular means. During changes in temperature the expansion bulge moved in both directions by approximately 7 mm. of expansion and contraction, and of course the vents prevented the formation of any air cushion which could resist movement of the inner liner or which could damage the latter.

Actual tests carried out with the structure of my invention have demonstrated that the expansion bulge is capable of compensating for variations in temperature of more than 200° C. with or without any particular internal pressure being established in the tube, and this extent of temperature variation did not result in any undesirable fracture of any type in the plastic liner. During the course of these tests the extent of expansion and contraction of the expansion bulge was carried out by measurements made through one of the air vents with a suitable measuring instrument.

I claim:

1. A tubular assembly comprising outer and inner tubular means connected to each other at least at one end, said outer and inner tubular means having substantially different coefficients of thermal expansion, said inner tubular means extending along the interior of said outer tubular means and forming a liner therefor, said outer tubular means having an annular wall portion surrounding said inner tubular means and having an inner surface formed with an annular groove, said inner tubular means having an annular expansion bulge spanning said groove and extending only partly into said groove and providing said inner tubular means with an inner annular groove and with an outer circumferential rim extending partially into said groove of said outer tubular means, so that during expansion and contraction of said inner tubular means with respect to said outer tubular means said expansion bulge of said inner tubular means can move in said groove of said outer tubular means.

2. The combination of claim 1 and wherein said outer tubular means is made of metal and said inner tubular means is a non-metal.

3. The combination of claim 2 and wherein said inner tubular means is a plastic.

4. The combination of claim 1 and wherein said outer tubular means includes an end-flange portion welded to the remainder of said outer tubular means, and said groove of said outer tubular means being situated at said end flange portion thereof.

5. The combination of claim 1 and wherein said outer tubular means has an outer surface portion at said annular portion thereof which is formed with said inner groove, and said outer tubular means being formed with at least one air vent extending through the wall of said outer tubular means between said outer surface portion thereof and said inner groove thereof, to prevent build-up of resistance to movement of said expansion bulge in said groove of said outer tubular means.

6. The combination of claim 4 and wherein said groove of said outer tubular means is provided in the proximity of the end face of said end flange portion and wherein the surface of the groove facing the end face of the end flange defines an acute angle with the axis of the end flange portion.

7. The combination of claim 1 and wherein said inner groove of said outer tubular means merges smoothly into the inner surface of said outer tubular means so as to provide the assembly with a construction free of any sharp edges along which said inner tubular means might scrape during expansion and contraction of said inner tubular means with respect to said outer tubular means.

8. The combination of claim 1 and wherein said inner groove of said outer tubular means has at one end a substantially semicircular cross section and gradually merges smoothly from said one end of substantially semicircular cross section into the inner surface of said outer tubular means.

9. The combination of claim 1 and wherein said inner groove of said outer tubular means is defined on one side by a surface of substantially S-shaped cross section and on its opposite side by a frustoconical surface which merges smoothly into the interior surface of the remainder of said outer tubular means.

References Cited

UNITED STATES PATENTS

| | | | |
|---|---|---|---|
| 1,672,106 | 6/1928 | West | 138—140 |
| 1,924,657 | 8/1933 | Saine et al. | 285—55 X |
| 1,937,600 | 12/1933 | Spanyol | 138—140 X |
| 2,063,325 | 12/1936 | McLeod | 138—140 |
| 2,092,358 | 9/1937 | Robertson | 285—211 X |

HERBERT F. ROSS, *Primary Examiner.*

U.S. Cl. X.R.

138—97; 285—55, 213